(12) United States Patent
Chavez et al.

(10) Patent No.: US 10,882,598 B2
(45) Date of Patent: Jan. 5, 2021

(54) PRESSURIZED SLIDING DOOR

(71) Applicant: Bell Helicopter Textron Inc., Fort Worth, TX (US)

(72) Inventors: Jeremy Robert Chavez, Colleyville, TX (US); Brent Chadwick Ross, Flower Mound, TX (US)

(73) Assignee: Bell Textron Inc., Fort Worth, TX (US)

( * ) Notice: Subject to any disclaimer, the term of this patent is extended or adjusted under 35 U.S.C. 154(b) by 249 days.

(21) Appl. No.: 15/951,539

(22) Filed: Apr. 12, 2018

(65) Prior Publication Data
US 2019/0315448 A1 Oct. 17, 2019

(51) Int. Cl.
| | |
|---|---|
| *B64C 1/14* | (2006.01) |
| *B64D 13/02* | (2006.01) |
| *E06B 3/38* | (2006.01) |
| *E06B 7/23* | (2006.01) |
| *B64C 29/00* | (2006.01) |

(52) U.S. Cl.
CPC ............ *B64C 1/1438* (2013.01); *B64D 13/02* (2013.01); *E06B 3/38* (2013.01); *E06B 7/2318* (2013.01); *B64C 29/0033* (2013.01)

(58) Field of Classification Search
CPC . B64C 1/1438; B64C 29/0033; B64C 1/1461; B64C 1/143; B64D 13/02; E06B 3/38; E06B 7/2318
See application file for complete search history.

(56) References Cited

U.S. PATENT DOCUMENTS

| | | | | |
|---|---|---|---|---|
| 2,560,665 | A * | 7/1951 | Stark | B64C 1/14 49/477.1 |
| 2,931,599 | A * | 4/1960 | McQuilkin | B64C 1/143 244/129.6 |
| 3,131,892 | A * | 5/1964 | Salmun | B64C 1/14 244/129.5 |
| 3,144,224 | A * | 8/1964 | Carroll | B64C 1/32 244/129.5 |
| 3,169,282 | A * | 2/1965 | Godwin | B64C 1/1415 49/40 |
| 3,226,780 | A * | 1/1966 | Landis | E06B 7/2309 49/368 |
| 3,296,742 | A * | 1/1967 | Radcliffe | E06B 7/18 49/319 |
| 3,585,757 | A * | 6/1971 | Ritchie | B64C 1/1407 49/215 |
| 3,802,125 | A * | 4/1974 | Baker | B64C 1/1438 49/360 |
| 4,375,876 | A * | 3/1983 | Stewart | B64C 1/1438 160/201 |

(Continued)

OTHER PUBLICATIONS

European Patent Office, "European Search Report," EP Application No. 19163151.4, dated Jul. 25, 2019, 3 pages, publisher Munich, Germany.

*Primary Examiner* — Valentina Xavier
(74) *Attorney, Agent, or Firm* — Fogarty LLP

(57) ABSTRACT

Embodiments are directed to systems and methods for a sliding door in a pressurized aircraft. In one embodiment, an aircraft comprises a fuselage having a door opening, and a door configured to slide into the door opening from within the fuselage, the door held in a closed position in the door opening by excess air pressure within the fuselage during operation of the aircraft.

17 Claims, 5 Drawing Sheets

(56) References Cited

U.S. PATENT DOCUMENTS

| | | | | |
|---|---|---|---|---|
| 4,579,192 A * | 4/1986 | Mueller | | F16J 15/46 |
| | | | | 180/281 |
| 5,001,866 A * | 3/1991 | Powell | | E06B 7/2318 |
| | | | | 49/477.1 |
| 5,064,147 A * | 11/1991 | Noble | | B64C 1/1407 |
| | | | | 244/129.5 |
| 5,540,404 A * | 7/1996 | Battenfield | | B64C 1/14 |
| | | | | 244/129.4 |
| 5,832,668 A * | 11/1998 | Faubert | | E05D 15/0643 |
| | | | | 49/215 |
| 5,868,355 A * | 2/1999 | Carter, Jr. | | B63B 19/08 |
| | | | | 114/117 |
| 5,979,828 A * | 11/1999 | Gruensfelder | | B64C 1/14 |
| | | | | 244/129.1 |
| 6,189,833 B1 * | 2/2001 | Ambrose | | B64C 1/1407 |
| | | | | 244/118.3 |
| 6,328,374 B1 * | 12/2001 | Patel | | B60J 5/06 |
| | | | | 296/155 |
| 7,290,736 B2 * | 11/2007 | Pahl | | B64C 1/1407 |
| | | | | 244/129.5 |
| 8,070,102 B2 * | 12/2011 | Kobayashi | | B64C 1/1438 |
| | | | | 244/129.4 |
| 8,347,649 B1 * | 1/2013 | Gavin | | E06B 7/2318 |
| | | | | 292/256.65 |
| 9,567,059 B2 * | 2/2017 | Scimone | | B64C 1/1407 |
| 9,617,783 B2 * | 4/2017 | Yahata | | B64C 1/14 |
| 10,036,197 B1 * | 7/2018 | Betts-Lacroix | | E06B 7/2318 |
| 2005/0060937 A1 * | 3/2005 | Dondlinger | | E06B 7/2318 |
| | | | | 49/118 |
| 2011/0089714 A1 * | 4/2011 | Kitayama | | E05D 15/101 |
| | | | | 296/155 |
| 2011/0315822 A1 * | 12/2011 | Fairchild | | B60J 5/062 |
| | | | | 244/129.5 |
| 2015/0210374 A1 * | 7/2015 | Poppe | | B64C 1/1461 |
| | | | | 49/477.1 |
| 2016/0245006 A1 * | 8/2016 | Joussellin | | E05D 15/0621 |

* cited by examiner

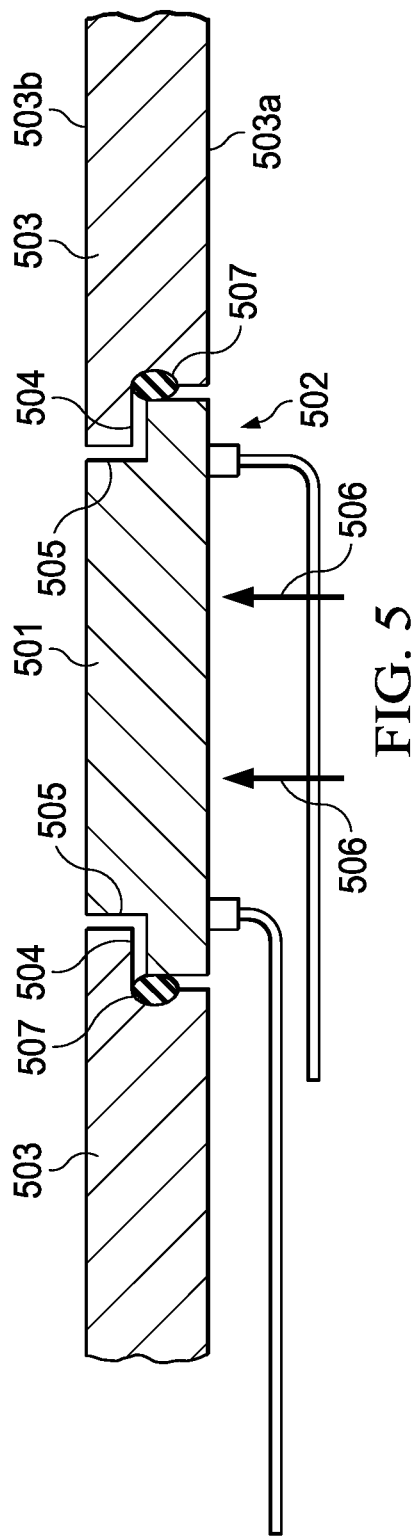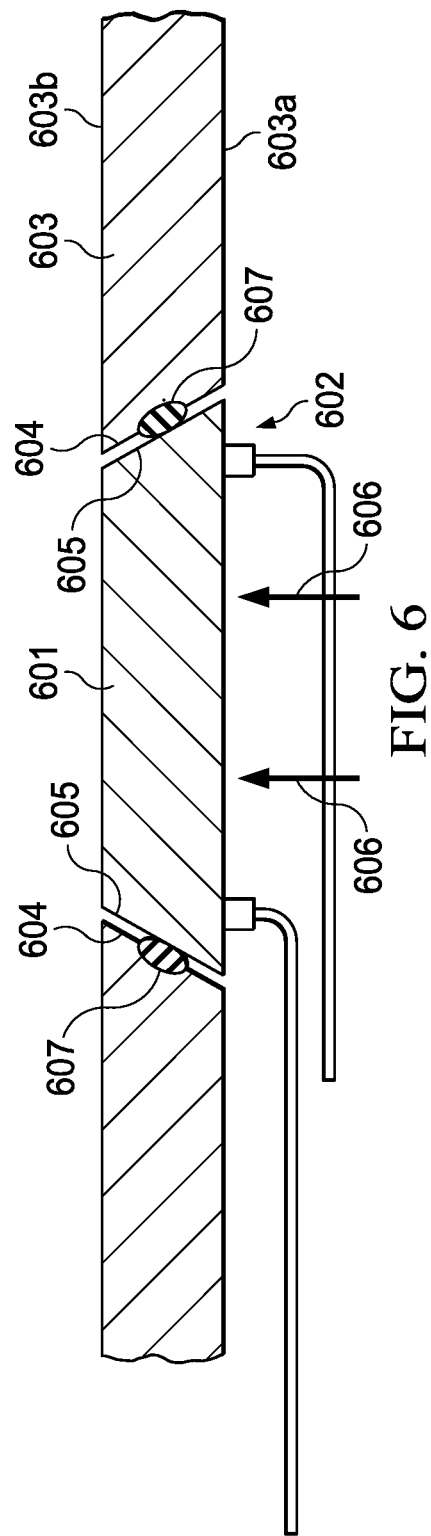

PRESSURIZED SLIDING DOOR

TECHNICAL FIELD

This invention relates generally to door systems, and more particularly, to a sliding door in a pressurized aircraft.

BACKGROUND

Typically, passenger doors in pressurized aircraft are relatively small to maintain the structural integrity of the airframe. Larger openings, such as those found in cargo aircraft, are hinged on one side of the door and use an extensive locking mechanism to keep the door sealed when the cabin is pressurized.

SUMMARY

Embodiments are directed to systems and methods for a sliding door in a pressurized aircraft. In one embodiment, an aircraft comprises a fuselage having a door opening, and a door configured to slide into the door opening from within the fuselage, the door held in a closed position in the door opening by excess air pressure within the fuselage during operation of the aircraft.

The aircraft may further comprise an environmental control system that is configured to generate an air pressure within the fuselage that is greater than an air pressure outside the fuselage. The excess air pressure within the fuselage may be generated using engine bleed air or mechanically or electrically driven compressors.

The door may be configured to slide horizontally or vertically within the fuselage between an open position and the closed position. The aircraft may further comprise tracks located in or on an aircraft cabin floor, and guides attached to the door and coupled to the tracks. The tracks may be configured to control the location of the door between an open position and the closed position. In addition to the tracks located on the aircraft floor, tracks may be located in an aircraft cabin ceiling.

The aircraft may further comprise a gasket mounted on the door or on the door opening. The gasket may be adapted to form an airtight seal between the door opening and the door in a closed position. The gasket may be inflatable using an engine bleed air source or through mechanically or electrically driven compressors. In some adaptations of fuselage pressurization such as protection from nuclear biological and chemical contamination rather than true altitude pressurization, an imperfect seal with greater leakage may be acceptable as long as a greater pressure can be maintained inside the fuselage.

An edge of the door opening may be adapted to prevent the door from moving past the door opening due to excess air pressure within the fuselage. The edge may have a ramped or sloped shape. Alternatively, a lip or ridge on the edge of the door opening may prevent the door from moving past the door opening due to excess air pressure within the fuselage.

BRIEF DESCRIPTION OF THE DRAWINGS

Figure 1:
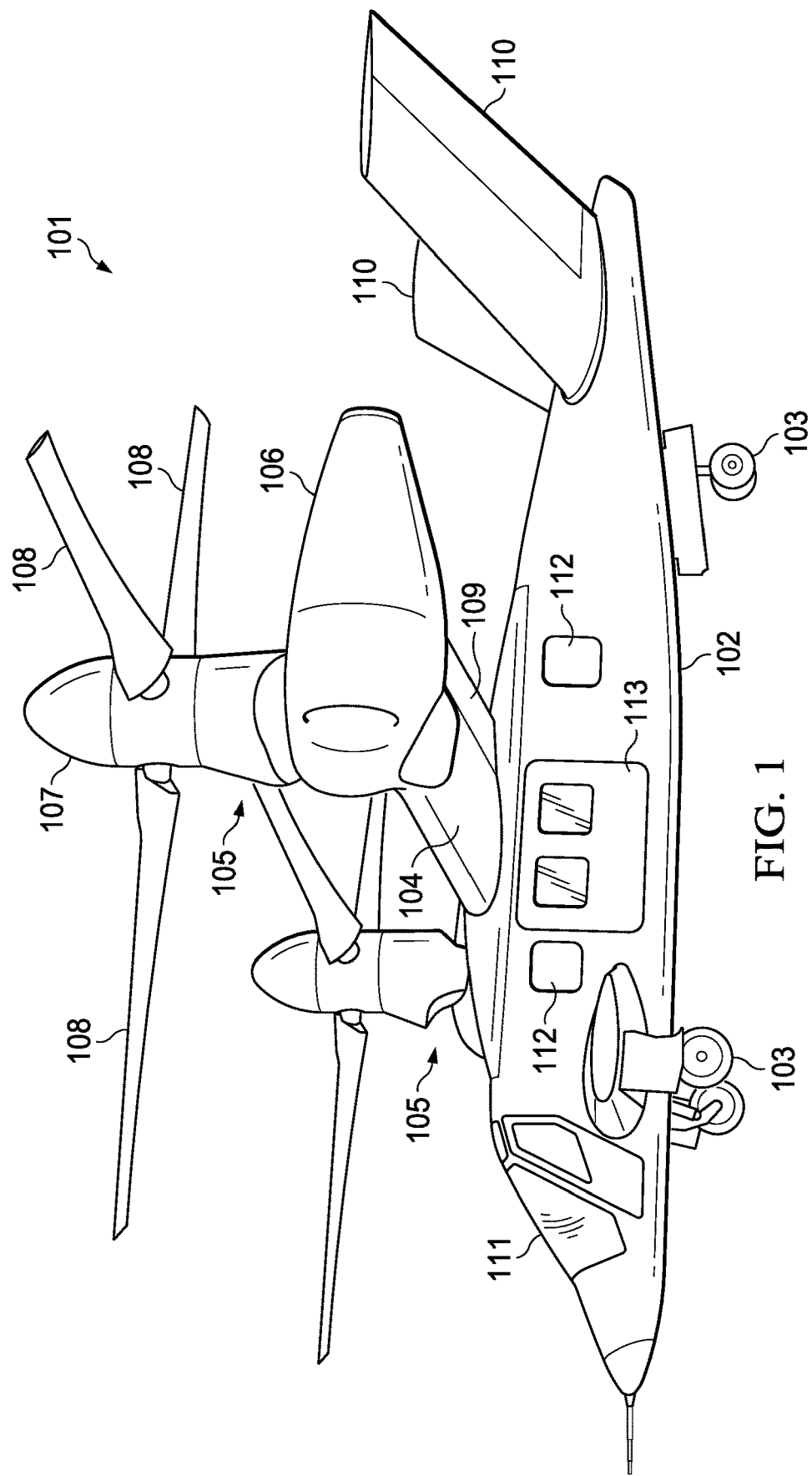

Having thus described the invention in general terms, reference will now be made to the accompanying drawings, which are not necessarily drawn to scale, and wherein:

FIG. 1 illustrates an aircraft that may be used with some embodiments of the pressurized sliding door disclosed herein.

Figure 2A:
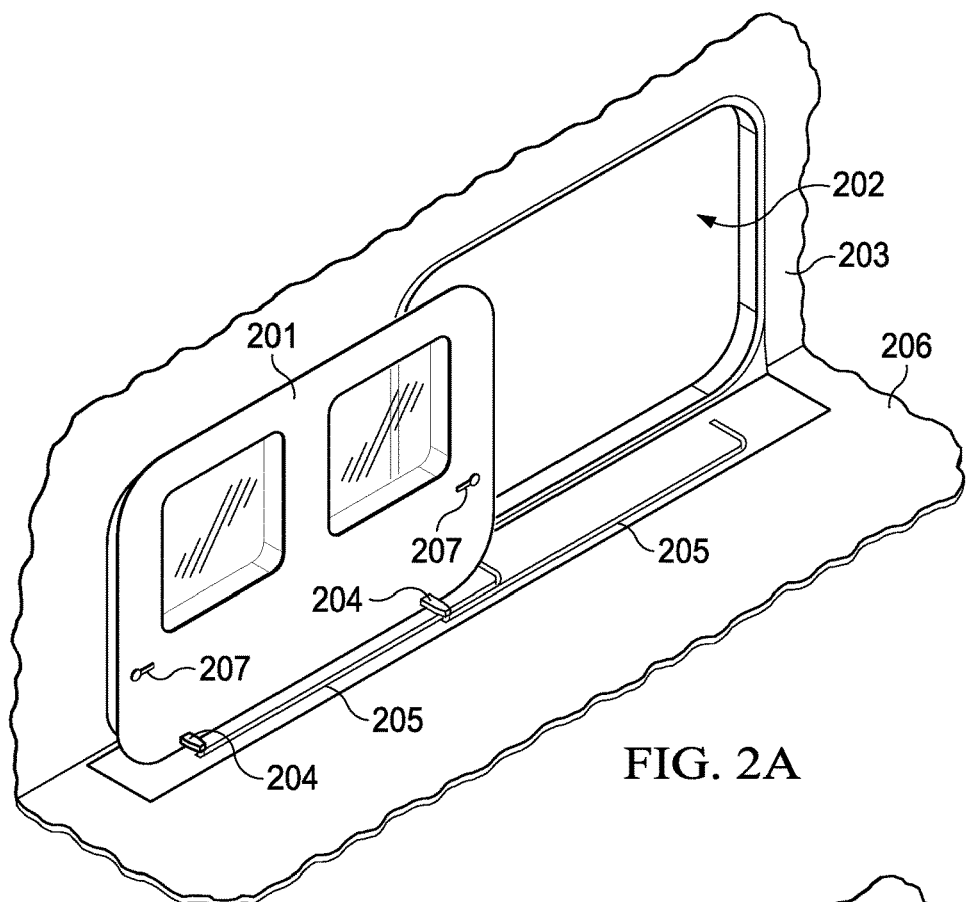
Figure 2B:
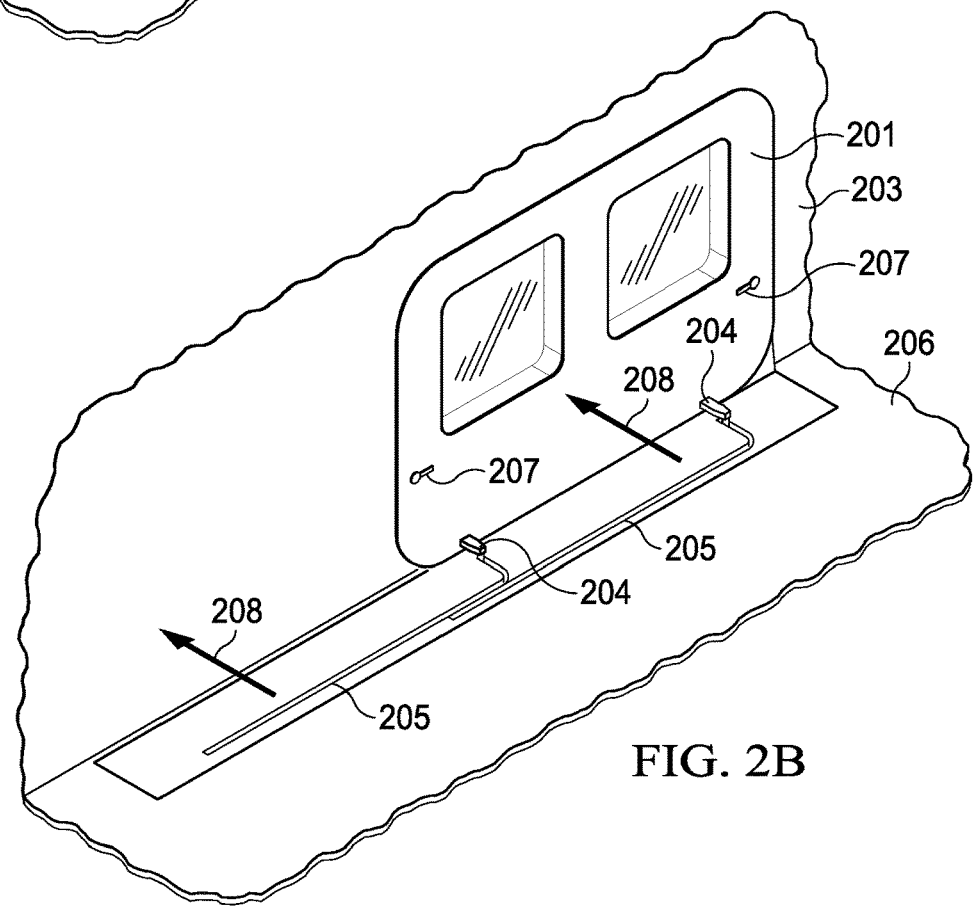

FIGS. 2A and 2B illustrate an internal view of an aircraft cabin having a sliding door in an open and closed position.

Figure 3A:
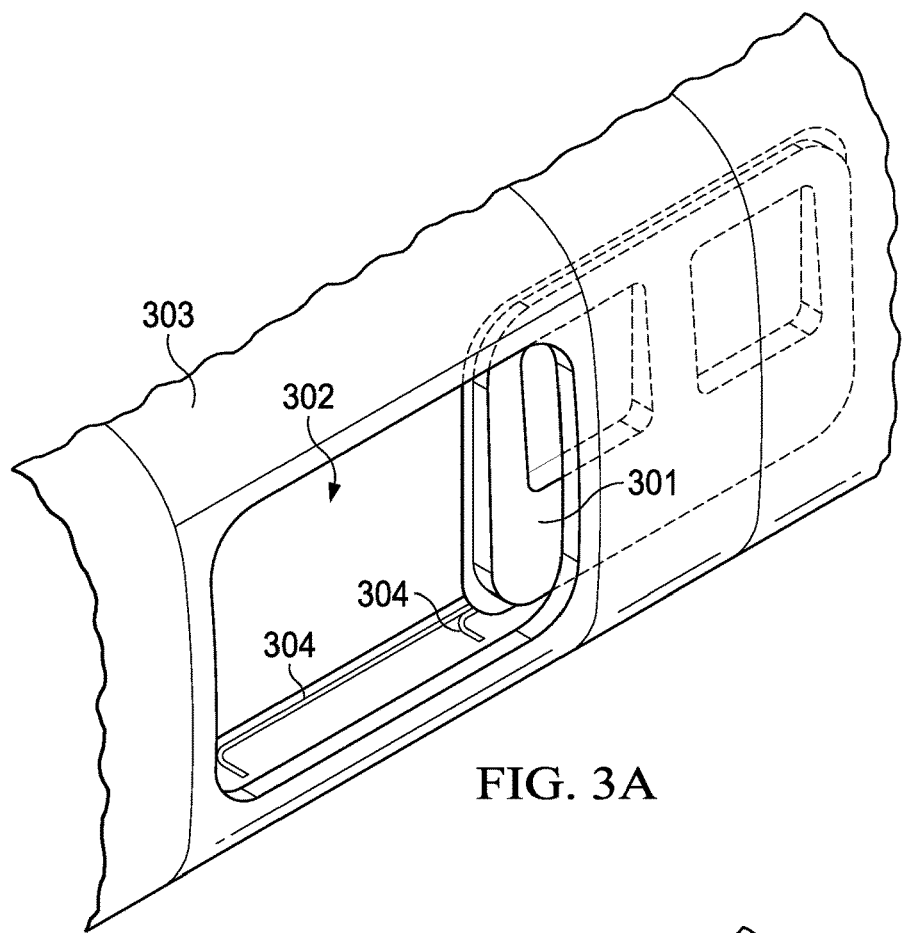
Figure 3B:
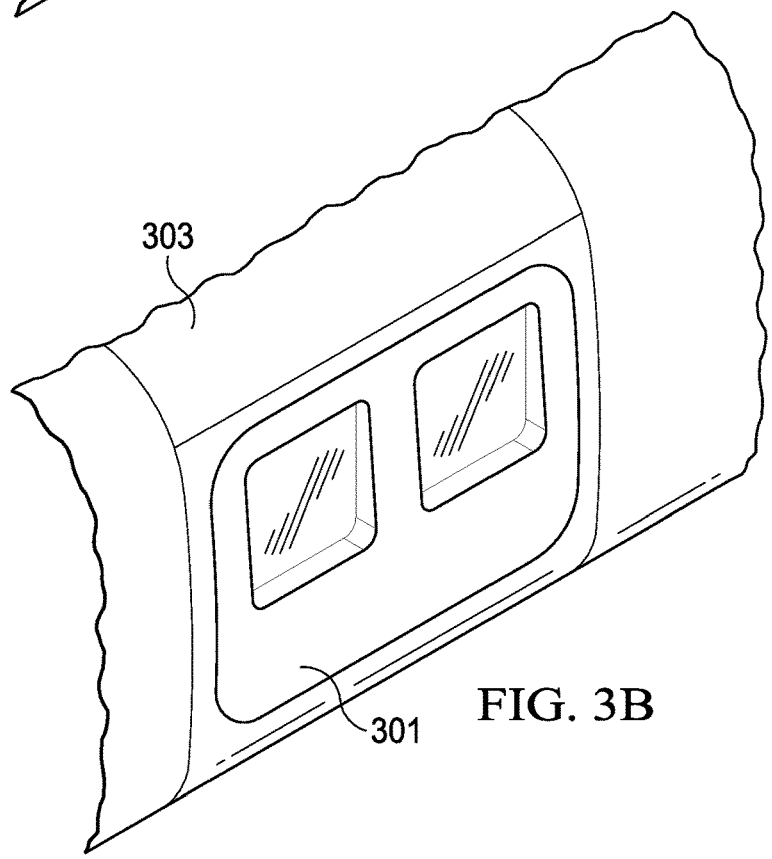

FIGS. 3A and 3B illustrate an external view of an aircraft cabin having a sliding door in an open and closed position.

Figure 4A:
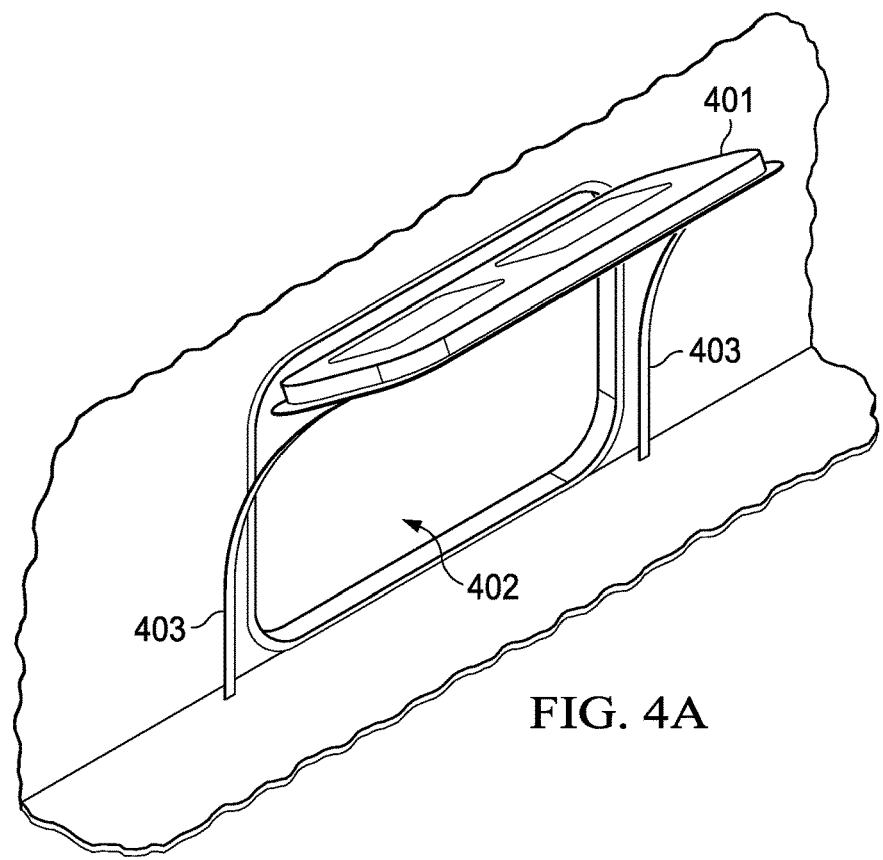

FIG. 4A illustrates an alternative embodiment in which a door slides vertically.

Figure 4B:
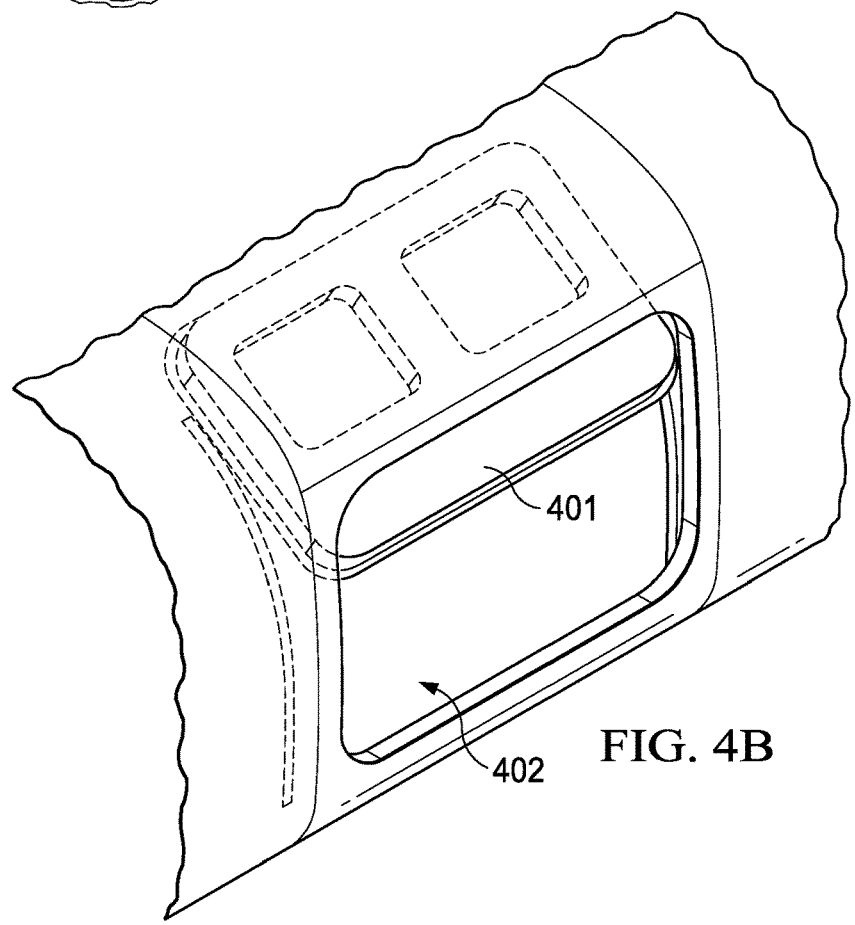

FIG. 4B illustrates the exterior of an aircraft having a vertically sliding door in an open position.

FIG. 5 illustrates a cross-section view of a closed sliding door according to one embodiment.

FIG. 6 illustrates a cross-section view of a closed sliding door according to another embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates an aircraft 101 that may be used with some embodiments of the pressurized sliding door disclosed herein. Aircraft 101 may include fuselage 102, landing gear 103, and wings 104. A propulsion system 105 is positioned on the ends of wings 104. Each propulsion system 105 includes an engine 106 and a proprotor 107 with a plurality of rotor blades 108. Engine 106 may rotate proprotor 107 and blades 108. Proprotor 107 may include a control system for selectively controlling the pitch of each blade 108 to control the direction, thrust, and lift of aircraft 101. Although FIG. 1 shows aircraft 101 in a helicopter mode wherein proprotors 107 are positioned substantially vertical to provide a lifting thrust. It will be understood that in other embodiments, aircraft 101 may operate in an airplane mode wherein proprotors 107 are positioned substantially horizontal to provide a forward thrust. Proprotors 107 may also move between the vertical and horizontal positions during flight as aircraft 101 transitions between a helicopter mode and an airplane mode. Wings 104 may provide lift to aircraft 101 in certain flight modes (e.g., during forward flight) in addition to supporting propulsion systems 105. Control surfaces 109 on wing 104 and/or control surfaces 110 are used to adjust the attitude of aircraft 101 around the pitch, roll, and yaw axes while in airplane mode. Control surfaces 109 and 110 may be, for example, ailerons, flaps, slats, spoilers, elevators, or rudders.

Fuselage 102 represents the body of aircraft 101 and may be coupled to propulsion system 105 such that proprotors 107 and blades 108 may move fuselage 102 through the air. Landing gear 103 supports aircraft 101 during landing and/or when aircraft 101 is at rest on the ground. Fuselage 102 may have windows to allow aircrew and passengers to see out of the aircraft, such as windows 111 in a cockpit area and windows 112 in the body of the aircraft. Fuselage 102 may also have one or more doors 113 to allow aircrew and passengers to enter and exit aircraft 101. One or more doors 113 may also be used to load and unload baggage, cargo, or freight. Fuselage 102 and doors 113 may be flat sided like shown or have additional curvature up to fully circular in cross-section to reduce pressurization loads.

Most commercial aircraft are pressurized for the safety and comfort of aircrew and passengers. Cabin pressurization is particularly necessary when flying in excess of 10,000 feet above sea level in order to prevent hypoxia, altitude sickness, and barotrauma. Aircraft 101 may be pressurized during flight by maintaining an airtight fuselage 102 that is filled with air by an environmental control system. Often, air for pressurization is provided by bleed air that is extracted from a compressor stage of a turbine engine. Passenger doors in existing aircraft are typically small to maintain the structural integrity of the airframe. This is particularly true in pressurized aircraft in which the passenger door must be sealed and locked closed to maintain cabin pressure. Aircraft with large openings, such as those found in cargo aircraft, are typically hinged on one side of the door and use an extensive locking mechanism to keep the door sealed when the cabin is pressurized.

In one embodiment, large sliding door 113 provides aircrew and passengers with an easy means to board in aircraft 101 along with the capability to load oversized cargo. Additionally, large sliding door 113 provides an escape route for aircrew and passengers should aircraft 101 encounter a water landing or other situation requiring rapid egress. Typically, large openings such as sliding door 113 are avoided on pressurized aircraft because the opening disrupts the integrity of the structural airframe. However, in the embodiments disclosed herein, sliding door 113 functions as a plug for the pressured cabin. When closed, sliding door 113 is secured so that cabin pressurization presses door 113 against the fuselage 102 airframe. The path of sliding door 113 may be guided by rails in the floor or ceiling of the aircraft cabin. By engaging the opening in fuselage 102 from the inside, sliding door 113 can be held in position by aircraft cabin pressure. When unpressurized, cabin door 113 provides a large opening for aircrew and passengers for ingress and egress and for loading and unloading operations. Door 113 may further include locking mechanisms for keeping the door in position during unpressurized operations. However, sliding door 113 provides a weight efficient solution for maintaining structural integrity of the pressurized cabin without requiring a locking mechanism.

Although FIG. 1 illustrates a tiltrotor aircraft 101, it will be understood that the pressurized sliding door disclosed herein may be used with any aircraft, including fixed wing, rotorcraft, commercial, military, or civilian. Moreover, although only one pressurized sliding door 113 is illustrated in FIG. 1, it will be understood that an aircraft may have multiple pressurized sliding doors, such as doors on opposite sides of the aircraft, and/or pressurized sliding doors. The doors like the fuselage can have varying degrees of curvature from flat up to fully circular to reduce pressurization loads.

FIG. 2A illustrates an internal view of an aircraft cabin having a sliding door 201 configured to fit in opening 202 of cabin wall 203. Sliding door 201 has two or more guides 204 that are adapted to move along grooves 205 on the cabin floor 206. Sliding door 201 moves from the open position shown in FIG. 2A to the closed position shown in FIG. 2B by sliding along grooves 205. In one embodiment, guides 204 may be rollers or wheels that move within a groove or track 205 that is formed in the cabin floor 205. The layout of the grooves 205 control the movement of door 201. Grooves 205 may be configured to position door 201 closely along cabin wall 203 when in the open position and/or while moving between the open and closed positions in order to minimize the space used by door 201 within the cabin area. In another embodiment, door 201 may be guided along rails or racks that are raised above cabin floor 206 instead of using in-floor grooves 205. Door 201 may have brackets with wheels or guides that move along the rails or racks to control the position of door 201 while moving between the open and closed positions.

Additionally, another set of guides (not shown) may be provided on the top of door 201 and adapted to move within grooves or rails (not shown) mounted on the cabin ceiling. In this configuration, the positioning of door 201 would be more accurately controlled because it is being guided at both the top and bottom.

In one embodiment, door 201 may have one or more latches 207 that are used to hold door 201 in the closed position. However, air pressure 208 within the aircraft cabin is the primary force holding door 201 in the closed position.

FIG. 3A illustrates an external view of an aircraft having a sliding door 301 configured to fit in opening 302 of fuselage 303. Sliding door 301 is configured to move along grooves 304 on the cabin floor 305. Sliding door 301 moves from the open position shown in FIG. 2A to the closed position shown in FIG. 2B by sliding along grooves 304.

FIG. 4A illustrates an alternative embodiment in which door 401 slides vertically instead of horizontally. Door 401 slides up and out of opening 402 along rails 403. FIG. 4B illustrates the exterior of an aircraft having a vertically sliding door 401 in an open position. Door 401 may move down along rails or tracks to a closed position, such as shown in FIG. 3B. Gravity may also be used in this configuration to keep the door in a lowered position. However, when lowered, the air pressure within the aircraft cabin would be the primary force holding door 401 in a closed position.

FIG. 5 illustrates a cross-section view of a closed sliding door 501 according to one embodiment. Sliding door 501 fits into opening 502 in aircraft wall 503. Aircraft wall 503 has an inside 503a that is within the aircraft and an outside 503b that is external to the aircraft. Edges 504 of wall 503 may have a stepped or other shape with a lip or ridge that is configured to mate with edges 505 of door 501 and to prevent door 501 from moving past wall 503. Air pressure 506 within the aircraft cabin provides the primary force holding door 501 in a closed position within opening 502. Seals or gasket 507 may provide an airtight closure between the edges 504 of wall 503 and the edges 505 of door 501. Seals 507 may be, for example, rubber, foam, or some other flexible material. Seals 507 may be constructed of a solid material or may be hollow. If hollow, seals 207 may be inflatable, such as using engine bleed air source or mechanically or electrically driven compressors, so that seals 207 will expand to ensure an airtight closure.

FIG. 6 illustrates a cross-section view of a closed sliding door 601 according to another embodiment. Sliding door 601 fits into opening 602 in aircraft wall 603. Aircraft wall 603 has an inside 603a that is within the aircraft and an outside 603b that is external to the aircraft. Edges 604 of wall 603 may have a ramped shape that is configured to mate with edges 605 of door 601 and to prevent door 601 from moving past wall 603. Air pressure 606 within the aircraft cabin provides the primary force holding door 601 in a closed position within opening 602. Seals 607 may provide an airtight closure between the edges 604 of wall 603 and the edges 605 of door 601.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An aircraft, comprising:
   a fuselage having a door opening;
   a door configured to slide into the door opening from within the fuselage, wherein the door is configured to slide horizontally within the fuselage between an open position and the closed position, wherein an inner edge of the door opening is wider than an outer edge of the door opening and wherein the edges are adapted to prevent the door from moving outside the door opening, and wherein the door is held in a closed position in the door opening by excess air pressure within the fuselage during operation of the aircraft.

2. The aircraft of claim 1, further comprising:
   an environmental control system configured to generate an air pressure within the fuselage that is greater than an air pressure outside the fuselage.

3. The aircraft of claim 1, wherein the excess air pressure within the fuselage is generated using engine bleed air or mechanically or electrically driven air compressors.

4. The aircraft of claim 1, further comprising:
   tracks located in an aircraft cabin floor; and
   guides attached to the door and coupled to the tracks, wherein the tracks are configured to control the location of the door between an open position and the closed position.

5. The aircraft of claim 4, further comprising:
   tracks located in an aircraft cabin ceiling.

6. The aircraft of claim 1, further comprising:
   a gasket mounted on the door opening, the gasket adapted to form a seal between the door opening and the door in a closed position.

7. The aircraft of claim 6, wherein the gasket is inflatable using engine bleed air or mechanically or electrically driven air compressors.

8. The aircraft of claim 1, further comprising:
   a gasket mounted on the door, the gasket adapted to form a seal between the door opening and the door in a closed position.

9. The aircraft of claim 1, wherein the edge has a ramped or sloped shape.

10. The aircraft of claim 1, wherein the edge has a rectangular stepped shape, and wherein a lip or ridge on the edge of the door opening prevents the door from moving past the door opening due to excess air pressure within the fuselage.

11. An aircraft door system, comprising:
    tracks disposed on or in an aircraft cabin floor;
    a door configured to slide into a door opening from within a fuselage, wherein the door is configured to slide horizontally within the fuselage between an open position and the closed position; and
    guides attached to the door and coupled to the tracks, wherein the tracks are configured to control the location of the door between an open position and the closed position,
    wherein an inner edge of the door opening is wider than an outer edge of the door opening and wherein the edges are adapted to prevent the door from moving outside the door opening, and wherein the door is held in a closed position in the door opening by excess air pressure within the fuselage during operation of the aircraft.

12. The aircraft door system of claim 11, further comprising:
    tracks located in an aircraft cabin ceiling.

13. The aircraft door system of claim 11, further comprising:
    a gasket mounted on the door opening, the gasket adapted to form a seal between the door opening and the door in a closed position.

14. The aircraft door system of claim 13, wherein the gasket is inflatable using engine bleed air or mechanically or electrically driven air compressors.

15. The aircraft door system of claim 11, further comprising:
    a gasket mounted on the door, the gasket adapted to form a seal between the door opening and the door in a closed position.

16. The aircraft door system of claim 11, wherein the edge has a ramped or sloped shape, or wherein a lip or ridge on the edge of the door opening prevents the door from moving past the door opening due to excess air pressure within the fuselage.

17. The aircraft door system of claim 11, wherein the edge has a rectangular stepped shape, and wherein a lip or ridge on the edge of the door opening prevents the door from moving past the door opening due to excess air pressure within the fuselage.

* * * * *